Aug. 28, 1945.  C. S. WATT  2,383,754
DRIVING MECHANISM FOR VEHICLES
Filed July 11, 1942  3 Sheets-Sheet 1
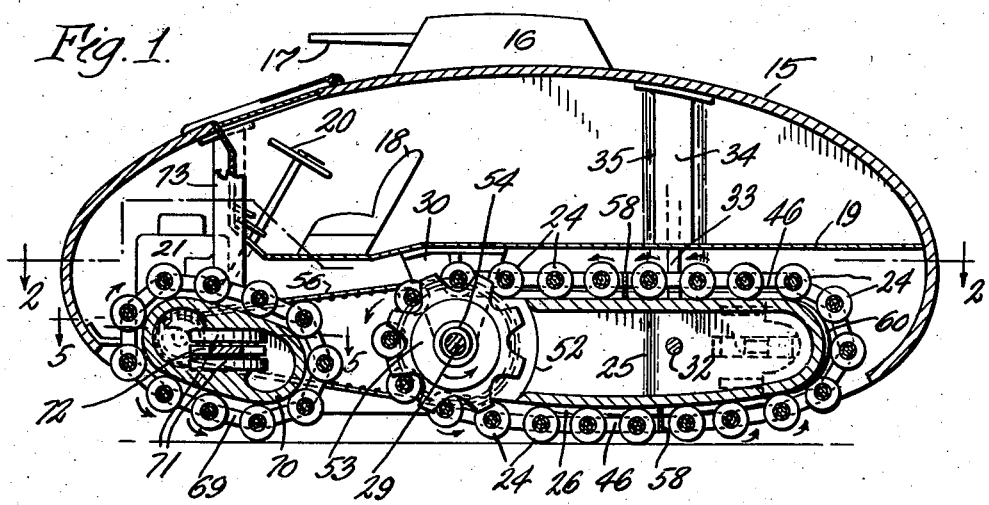
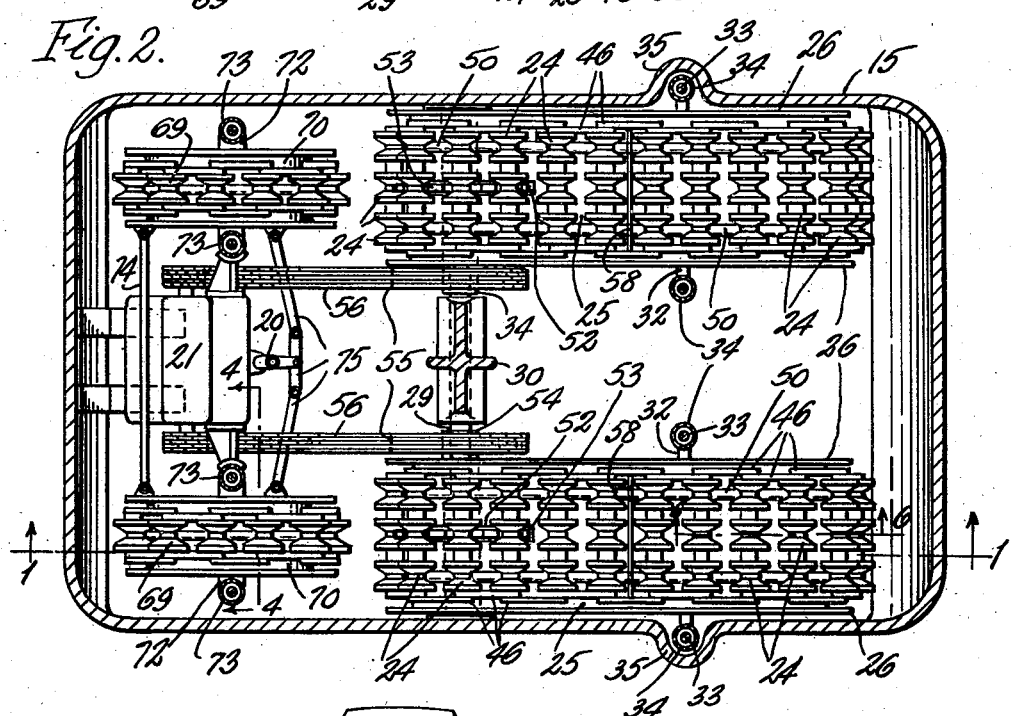
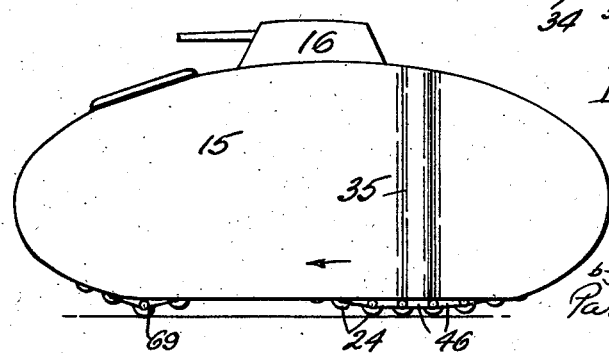
INVENTOR
Colin S. Watt
by Parker, Rockwell & Farmer
ATTORNEYS Aug. 28, 1945.  C. S. WATT  2,383,754
DRIVING MECHANISM FOR VEHICLES
Filed July 11, 1942  3 Sheets-Sheet 2
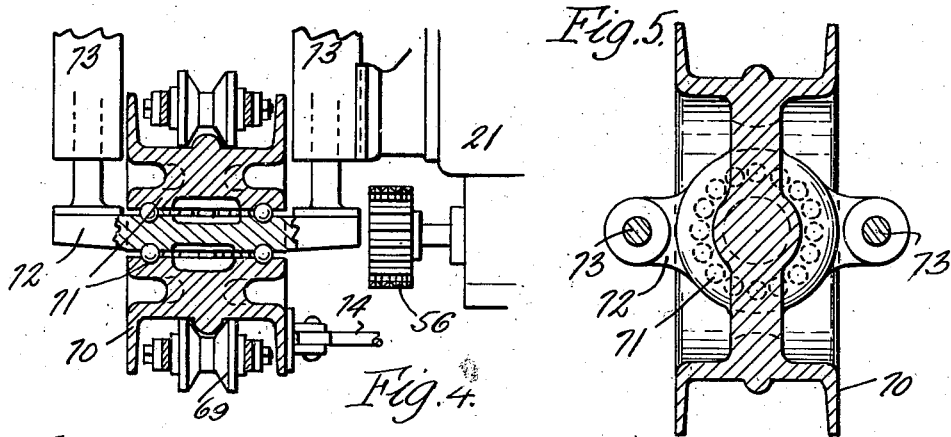
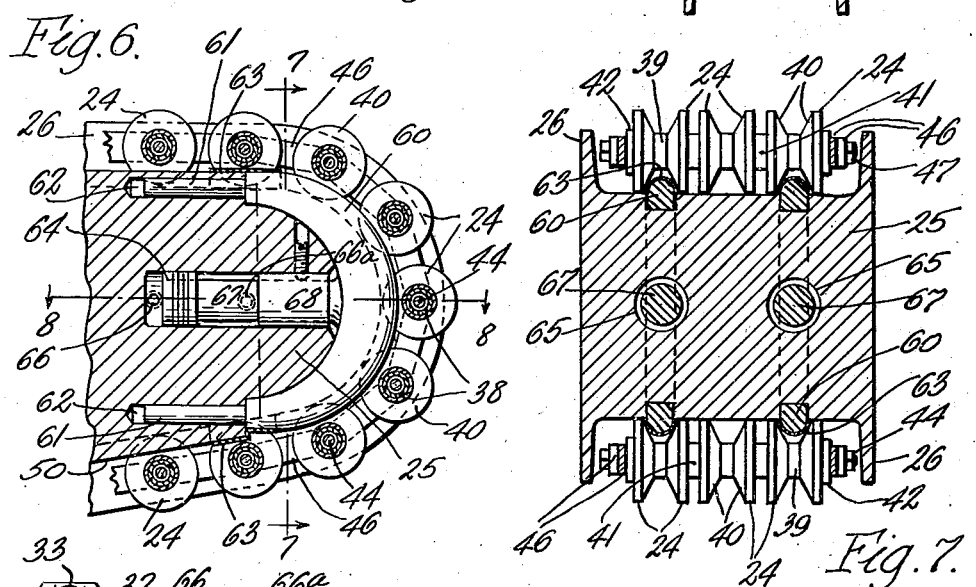
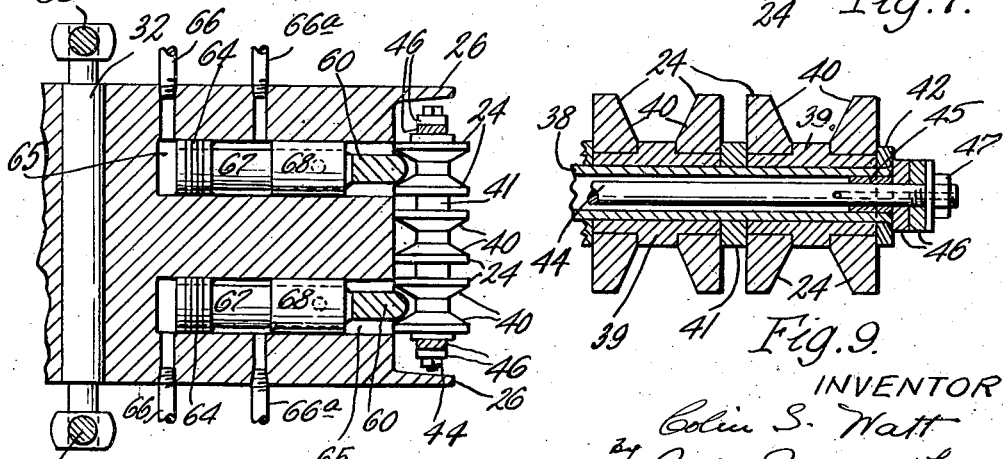
INVENTOR
Colin S. Watt
by Parker, Mockurn & Farmer
ATTORNEYS Aug. 28, 1945.   C. S. WATT   2,383,754
DRIVING MECHANISM FOR VEHICLES
Filed July 11, 1942   3 Sheets-Sheet 3

INVENTOR
Colin S. Watt
By Parker, Rockwood & Farmer
ATTORNEYS

Patented Aug. 28, 1945

2,383,754

UNITED STATES PATENT OFFICE 2,383,754

DRIVING MECHANISM FOR VEHICLES

Colin S. Watt, Buffalo, N. Y.

Application July 11, 1942, Serial No. 450,497

8 Claims. (Cl. 305—4)

This invention relates to power driven vehicles and more particularly to improved driving mechanism for such vehicles.

My improved driving mechanism is illustrated in the accompanying drawings as applied to an armored vehicle or tank, but it will be understood that it is not intended to limit this invention to use in connection with vehicles of this type.

One of the objects of this invention is to provide an improved driving mechanism for vehicles which is efficient in the use of power and by means of which improved cushioning effect is produced from soled or hard rubber wheels or rollers. It is also an object of this invention to produce a driving mechanism by means of which improved traction is obtained when travelling over soft or loose ground. Another object is to provide a drive mechanism which includes a driven chain having a plurality of small wheels mounted thereon which operate between a guide track or chain carrier and the ground, the chain being driven from an engine or other power device for imparting motion to the vehicle. Another object of this invention is to provide the chain with wheels of improved construction. A further object of the invention is to provide a vehicle driving mechanism of this type with means of improved construction for taking up slack in the chain. Another object of this invention is to provide means of improved construction for applying a braking force to the driving mechanism.

It is also an object of this invention to provide an improved spring mounting for supporting a vehicle body on my improved drive mechanism.

Other objects and advantages of this invention will appear from the following description and claims.

In the accompanying drawings:

Fig. 1 is a longitudinal sectional elevation of a vehicle provided with driving mechanism embodying this invention, the section being taken approximately on line 1—1, Fig. 2.

Fig. 2 is a sectional plan view thereof, on line 2—2, Fig. 1.

Fig. 3 is a side elevation of the vehicle on a smaller scale.

Fig. 4 is a fragmentary transverse sectional elevation thereof, on line 4—4, Fig. 2.

Fig. 5 is a fragmentary sectional plan view thereof, on line 5—5, Fig. 1.

Fig. 6 is a fragmentary sectional elevation thereof, on line 6—6, Fig. 2.

Fig. 7 is a fragmentary transverse sectional elevation thereof, on line 7—7, Fig. 6.

Fig. 8 is a fragmentary sectional plan view thereof, on line 8—8, Fig. 6.

Fig. 9 is a fragmentary central sectional view of a pair of wheels or rollers used in connection with my improved driving mechanism.

Figure 10:
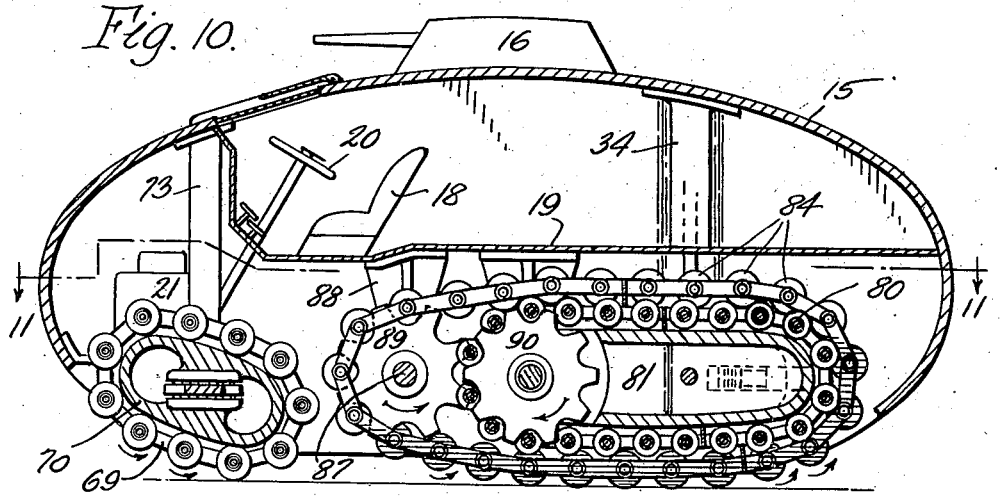
Fig. 10 is a sectional elevation of a vehicle drive mechanism of modified construction, the section being taken on line 10—10, Fig. 11.

In the particular embodiment of the invention shown by way of example in the drawings, my improved drive mechanism is shown as applied to an armored car or tank having a shell or body 15 and a turret 16 which may be provided with a gun 17. The driver of the vehicle sits on a seat 18 mounted on a floor or support 19 and controls the operation of the vehicle by means of the usual control pedals or levers, and a steering wheel 20. 21 represents an engine or motor of any suitable type for delivering power by means of which the vehicle is propelled. A body of any other suitable or desired construction may, of course, be provided in place of that shown in the drawings, and in the construction illustrated, the body also serves as a frame on which the drive mechanism is mounted.

Traction is applied to the vehicle by means of one or more endless chains having wheels or rollers 24 pivotally mounted thereon, which are preferably made of hard or solid rubber, or at least have rims or peripheral portions of solid rubber or other resilient material. The chain extends about a chain carrier 25 which is provided on its peripheral portion with a suitable track for guiding the chain about the carrier. The carrier shown may, for example, have guide flanges 26 at opposite sides thereof to confine the chain in its operative relation to the carrier. As a result of this construction, it will be noted that the wheels 24 when in contact with the ground, also have their upper portions bearing against the lower surface of the chain carrier 25. Consequently, when the chain is moved lengthwise by power, rotary motion will be imparted to the wheels 24, due to their frictional contact with the underface of the chain carrier, and this rotary motion results in the movement of the vehicle over the ground.

The chain carrier for the power driven chains may be of any suitable or desired construction, and as shown in the drawings, two of these carriers are employed, one at each side of the vehicle. One end of each carrier, for example, the front end thereof is pivoted or journalled on a transverse shaft 29 which is suitably mounted on the frame of the vehicle, for example, the ends of the shaft may be secured on the vehicle shell or body 15 and the middle portion thereof may be suitably reinforced, for example, by means of a brace 30 secured to the floor 19 of the vehicle. This permits the chain carriers to swing about their connections with the shaft 29 and I preferably employ this swinging motion of the chain carriers to provide a spring mounting for the vehicle body on the carriers by providing this mounting for the ends of the carriers remote from the shaft 29. Any suitable spring mounting may be used for this purpose, and in the construction shown, I provide each carrier with an axle or shaft 32, the ends of which are connected by means of upright rods 33 to suitable cushioning means or shock absorbers 34. In order to accommodate the outer upright rods 33 and the cushioning or shock absorbing members 34, the side walls of the shell 15 may be provided with outwardly extending upright channel-shaped portions 35, or if desired, the frame may be made wider to accommodate these rods and shock absorbers.

The roller chain may be made of any suitable or desired form for supporting the wheels or rollers 24. In the particular construction illustrated by way of example, the chain (see particularly Fig. 9) includes a plurality of hollow or tubular shafts 38 on which the wheels 24 are rotatably mounted. These wheels may be of any suitable or desired construction, but as shown, they include disks arranged in pairs and mounted on hubs 39 which are mounted on the tubular shafts 38. One pair of wheels is mounted on each hub 39 and any desired number of these pairs of wheels may be mounted on each tubular shaft 38, three pairs being shown in the construction illustrated. Each wheel preferably has one side inclined as shown at 40, the two inclined sides of each pair facing each other to provide each wheel with a V-shaped annular groove. The hubs 39 may be separated from each other by means of spacers 41.

The ends of each tubular shaft are provided with collars 42 which are preferably countersunk so that the ends of the shaft may be expanded into the countersunk portions of the collars 42 for securely locking all of the pairs of wheels on the tubular shaft.

A rod or bolt 44 extends through each tubular shaft 38, bushings 45 being arranged at the ends of the tubular shafts 38 to space the rod 44 from the hollow shafts 38 and to exclude dust from the interiors of the hollow shafts. The ends of these rods 44 receive the connecting links 46 of the chain which extend from each end of each rod 44 on opposite sides to the next adjacent rods 44, and these links may be held in place on the rods 44 in any suitable manner, for example, by means of lock nuts 47. The space between the rod 44 and the tubular shaft 38 may be filled with grease to permit the shafts 38 to rotate about the rods 44, for lubricating suitable bearings (not shown) between the rods 44 and the tubular shafts 38, or if desired, the hubs 39 may be journalled to rotate on the hollow shaft 38.

Since the wheels are all assembled in the same relation to each other on the hollow shafts 38, it follows that the wheels on the chain will be arranged in a plurality of series extending lengthwise of any chain, each series including a pair of wheels of each hub 39. Three of these series are shown in Figs. 1-9, but one or any number of series may be employed.

In order to guide the chain about the chain carrier, the peripheral surface of the carrier is provided with one or more ribs or tracks 50, two such tracks being shown in the drawings, which are so arranged that each track may extend into the V-shaped grooves of one series of wheels of the chain, so that these wheels will be guided in their movement about the carrier. Guide tracks of any other suitable or desired construction for retaining the driving chain in correct relation to its carrier may be provided.

Since the wheels 24 are of relatively small size and large in number, the load of the vehicle will be distributed on a considerable number of these wheels. Since each of these wheels bears at one peripheral portion on the ground and at the opposite peripheral portion on the chain carrier, it follows that any shock due to striking an obstruction on the ground will be cushioned not only by the portion of the wheel striking the obstruction, but also by the portion of the wheel bearing against the carrier. The cushioning effect of the wheels is, therefore, approximately twice that of corresponding wheels mounted in the customary manner, and the driving mechanism is, consequently, also much less noisy than driving mechanisms heretofore used.

The chains may be driven in any suitable or desired manner, and in the construction shown, each of the two carriers 25 is provided in the portion thereof adjacent to the transverse shaft 29 with suitable longitudinal slots or recesses 52 in which sprocket gears 53 are arranged to rotate about the axis of the transverse shaft 29. The teeth of the sprocket gears preferably extend between adjacent pairs of wheels 24 of each hollow shaft 38 and engage the hubs 39 of such pairs of wheels, so that these sprocket wheels can transmit power to the chains for driving them in either direction. Power may be transmitted from the engine 21 to the sprocket wheels in any suitable or desired manner, and in the construction shown by way of example, each sprocket wheel is mounted on a sleeve 54 journalled to rotate about the cross shaft 29 and extending from a sprocket wheel beyond the inner face of the chain carrier. Pulleys 55 are mounted on the inner ends of the sleeves 54 and are connected by means of belts 56 of any suitable construction with the engine, or if desired, with a differential gear (not shown), which may be mounted adjacent to the engine, if such gear is desired. Any other means may, however, be provided for driving the chains.

As a result of the construction thus far described, it will be obvious that if the chains are driven in a direction so that the lower run of the chain contacting with the ground runs from the front to the rear of the vehicle, the wheels 24 will be caused to rotate by contact with the surface portion of the chain carrier 25 in a direction indicated by the arrows in Fig. 1, and this rotation reacting with the ground causes the vehicle to be propelled in a forward direction. The lower face of the chain carrier may be provided with any suitable or desired curvature to produce a tread portion of the shape desired. Preferably the opposite ends of the lower portion of the guide track of each carrier curve upwardly so as to enable the chains to climb over projections and irregularities on the surface on which the vehicle travels. By providing an elongated tread, as clearly shown in Fig. 1, a relatively large number of wheels will have contact with the ground at all times, so that the load of the vehicle is distributed over a large number of wheels. This facilitates the travel of the vehicle over soft ground.

If desired, scrapers may be provided for keeping the tracks of the wheel carriers free from accumulations of mud, clay, and other material which might interfere with the frictional contact between the wheels 24 and the carrier. For example, the chain links may have scrapers 58 secured thereto at intervals, which are formed to operate on the peripheral surfaces of the carriers.

I have also provided means for taking up slack in the chain as it wears. For this purpose, I provide at the ends of carriers opposite to the ends at which the sprocket wheels are mounted one or more adjustable track members 60 over which the wheels of the chain may operate. These track members 60 are so located as to form substantially extensions of the tracks or rails 50 of the carriers and are of curved form, as shown in Fig. 6, to correspond to the contour of the rear ends of the carriers. These adjustable track members 60 may be guided relatively to the carriers in any suitable manner, for example, by means of substantially cylindrical extensions 61 formed thereon which enter into and are guided by holes 62 in the carriers 25. It will be obvious that if the chain becomes loose on the carrier, by moving the two adjustable track members 60 rearwardly, this slack will be taken up. Shields 63 in the form of thin metal plates are preferably provided between the inner ends of the adjustable track members 60 and the carrier 25 to keep out dirt.

Means are preferably provided for holding the adjustable track members 60 in position to keep the chain at the desired tension, and for this purpose, each movable track member 60 is provided with a piston 64 formed to extend into a cylinder 65 bored in the end of the carrier. Fluid under pressure may enter through conduits 66 into the ends of cylinders 65, as shown in Fig. 8, to exert pressure on the ends of the pistons 64 in a direction to move the pistons and their adjustable track member 60 outwardly to take up slack on the chain.

Each piston 64 has a rod or portion 67 of reduced diameter which extends through a bushing or sleeve 68 suitably secured to the chain carrier 25. Another conduit 66a connects with another portion of the cylinder, so that fluid under pressure may act on the piston in a direction to move the track members 60 back to relieve tension on the chain. Any suitable or desired source of fluid pressure may be provided to actuate the pistons 64, but preferably a liquid is employed to which pressure may be applied in the same manner as to fluid operating brakes on motor vehicles. If desired, this fluid may be at an initial relatively small pressure, just sufficient to urge the movable track parts 60 rearwardly to a sufficient extent to take up slack in the chain.

I have also found that the movable guide tracks 60 may be employed for applying a braking force to the vehicle, this being done by applying greater fluid pressure to the heads of the pistons through the conduits 66. Consequently, the mechanism which has been described for taking up the slack in the chain may also be employed as brakes for the vehicle, since when the traction chains are tightened, they serve to stop the movement of the vehicle. Consequently, when the operator steps upon the brake pedal, he increases the liquid pressure acting on the piston 64 to such an extent that the movable track members 60 tighten the chain to apply the desired braking force. Any other means for braking the vehicle may, however, be employed, if desired.

The steering of the vehicle may be effected in any suitable or desired manner. I have illustrated in the drawings, a pair of idler chains 69 mounted on chain carriers 70 preferably arranged at the front of the vehicle. The chains 69 may be of similar construction to the driving chains which have been described, but are shorter inasmuch as the carriers 70 are also materially smaller than the carriers 25. The carriers 70 are also provided intermediate of their ends with suitable pivot bearings or fifth wheels 71 which are interposed between these carriers and transversely extending supporting members 72, in such a manner that the carriers 70 may swivel about substantially upright axes relatively to the supporting members 72. The ends of these supporting members are preferably connected to the vehicle frame through shock absorbers or spring members 73 suitably secured on the vehicle frame. The two front carriers 70 are preferably held in substantially parallel relation to each other by means of connecting rod 74 of any suitable or usual construction, and the carriers 71 are also connected by means of suitable links 75 to the steering wheel 20.

Figure 11:
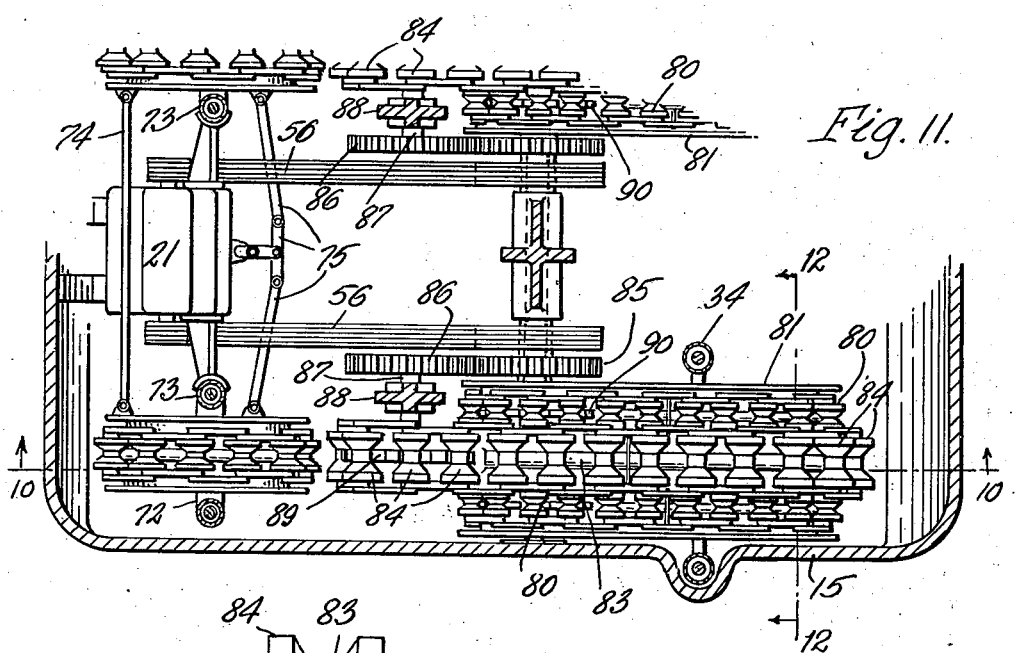
Fig. 11 is a fragmentary sectional plan view thereof, on line 11—11, Fig. 10.
Figure 12:
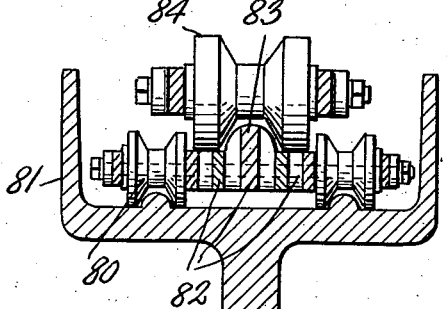
Fig. 12 is a fragmentary transverse section, on line 12—12, Fig. 11.

In Figs. 10 to 12, I have shown a modified form of drive mechanism, which includes two chains for each chain carrier. The first chain 80 is mounted on its carrier 81, which may be similar in construction to the carrier 25 which has already been described. The chain 80 may also be similar to the chain used in connection with Figs. 1 to 9, except that in this chain, as clearly shown in Fig. 12, only two series of wheels or rollers are employed, corresponding substantially to the outer two series described in connection with Figs. 1 to 9. The space between these two series of wheels is occupied by a plurality of links 82, and these links are so shaped as to form a continuous or endless guide track or rail 83 for the wheels or rollers 84 of the second or outer chain, as shown in Fig. 12. The first or inner chains may be driven in the same manner as the chains described in Figs. 1 to 9, except that the chains in Figs. 10 to 12 are driven in the reverse direction and since the middle series of wheels is omitted, two sprocket wheels 90 are provided for each chain in place of the single sprocket wheel shown in Fig. 2. The driving shaft for each chain 80 also has a gear wheel 85 secured thereto which meshes with a gear wheel 86 mounted on a shaft 87 suitably secured in place, for example, by means of brackets 88 secured to the floor or other supporting structure of the vehicle. These shafts 87 have sprocket wheels 89 secured thereto which drive the outer chain. Consequently, by means of this drive, the two chains will be driven in opposite directions.

The advantage of the construction shown in Figs. 10 to 12 is that the rollers of the outer chains receive more power to roll over clay and similar soil, since they are positively driven by the moving tracks 82 of the inner chains, instead of contacting with the stationary surfaces of the chain carriers.

In driving mechanisms of the type herein described, the rollers, which are either made entirely or in part of rubber, are under double compression, as is clearly seen in Figs. 1 and 10, in that one face of each roller bears against the ground, and the other on its guide track. Consequently, each wheel or roller provides twice as much cushioning effect as would a similar roller or wheel which is subject to compression on one face only thereof. In the construction shown in Figs. 10 to 12, one face of each of the rollers of the inner chain is also under compression, thus further increasing the cushioning effect. By having the chain carriers contact directly with the resilient surfaces of the wheels, the operation of my improved drive mechanism is also less noisy than chain or belt drive mechanisms now commonly employed.

I claim as my invention:

1. Driving mechanism for a vehicle, including a chain carrier having a track formed thereon, an endless chain extending around said carrier, wheels mounted on said endless chain and engaging said carrier and arranged to contact the ground during the travel of said chain, said wheels when contacting with the ground being arranged with their upper portions contacting with said carrier, a sprocket wheel mounted on one end of said vehicle and engaging said chain for imparting motion thereto, an adjustable track portion mounted on the other end of said base and movable relatively to said base for taking up slack in said chain, and means for imparting motion to said sprocket wheel.

2. Driving mechanism for a vehicle, including an endless chain, a plurality of wheels rotatably mounted on said chain, and arranged in pairs, said pairs of wheels forming a series of wheels lengthwise of said chain, a chain carrier about which said chain travels, a track on said chain carrier with which a series of said wheels cooperates to hold the chain in correct relation to said carrier, the wheels of each pair of a series being arranged to engage opposite sides of said track, and means for imparting movement to said chain for moving the wheels of said chain into rolling contact with said carrier and the ground, a portion of said track being movable in a direction to take up slack in said chain.

3. Driving mechanism for a vehicle, including an endless chain, a plurality of wheels rotatably mounted on said chain, a chain carrier about which said chain travels and which has a portion thereof arranged adjacent to the ground to cause wheels to be moved by said chain into rolling contact with said carrier and the ground, a part of said carrier being movable relatively to another part of said carrier to take up slack in said chain, and means operated by fluid pressure for effecting relative movement of said parts of said carrier and for maintaining said chain at the desired tension.

4. Driving mechanism for a vehicle, including an endless chain, a chain carrier about which said endless chain travels, wheels mounted on said chain to be moved by said chain into rolling contact with said carrier and the ground, means for mounting one end portion of said chain carrier on said vehicle to swing about a substantially horizontal axis, and spring means for connecting the other end portion of said carrier with said vehicle.

5. Driving mechanism for a vehicle, including an endless chain, a chain carrier about which said endless chain travels, wheels journalled on said chain and arranged to be moved by said chain into rolling contact with said carrier and the ground, means for providing a substantially horizontal pivotal connection between one end portion of said chain carrier and said vehicle, a sprocket wheel engaging said chain and rotatable relatively to said chain carrier about an axis substantially coinciding with the axis of said pivotal connection, and means for yieldingly connecting the other end portion of said chain carrier with said vehicle.

6. A vehicle having a plurality of endless chains, chain carriers about which said chains travel, wheels mounted on said chains and arranged to be moved by said chain into rolling contact with said carriers and the ground, power driven means for imparting movement to at least one of said chains, means for pivoting the carrier of another of said chains to swing about a substantially upright axis, and steering means connected with said last mentioned carrier for swinging the same about said pivotal connection to steer said vehicle.

7. A vehicle including a body, a chain carrier mounted on said body and having a track extending about a peripheral part thereof, a chain extending about said carrier and having wheels mounted thereon guided by said track and having links formed to produce a second track, a second chain extending about said first chain and having wheels thereon adapted to be moved by said second chain into rolling contact with the ground and with said second chain, the wheels of said second chain being guided by said second track, and means for driving said chains in opposite directions.

8. A vehicle including a body, a chain carrier on said body, an endless chain movable on said carrier and having a portion thereof forming a track, a second endless chain extending about said first chain and having wheels pivotally mounted thereon and moved by the travel of said second chain into rolling contact with the ground and with said track of said first chain, and means for driving said chains in opposite directions.

COLIN S. WATT.